D. L. APPELBERRY.
MEAT SLICER.
APPLICATION FILED OCT. 26, 1907.
915,532.
Patented Mar. 16, 1909.
3 SHEETS—SHEET 3.
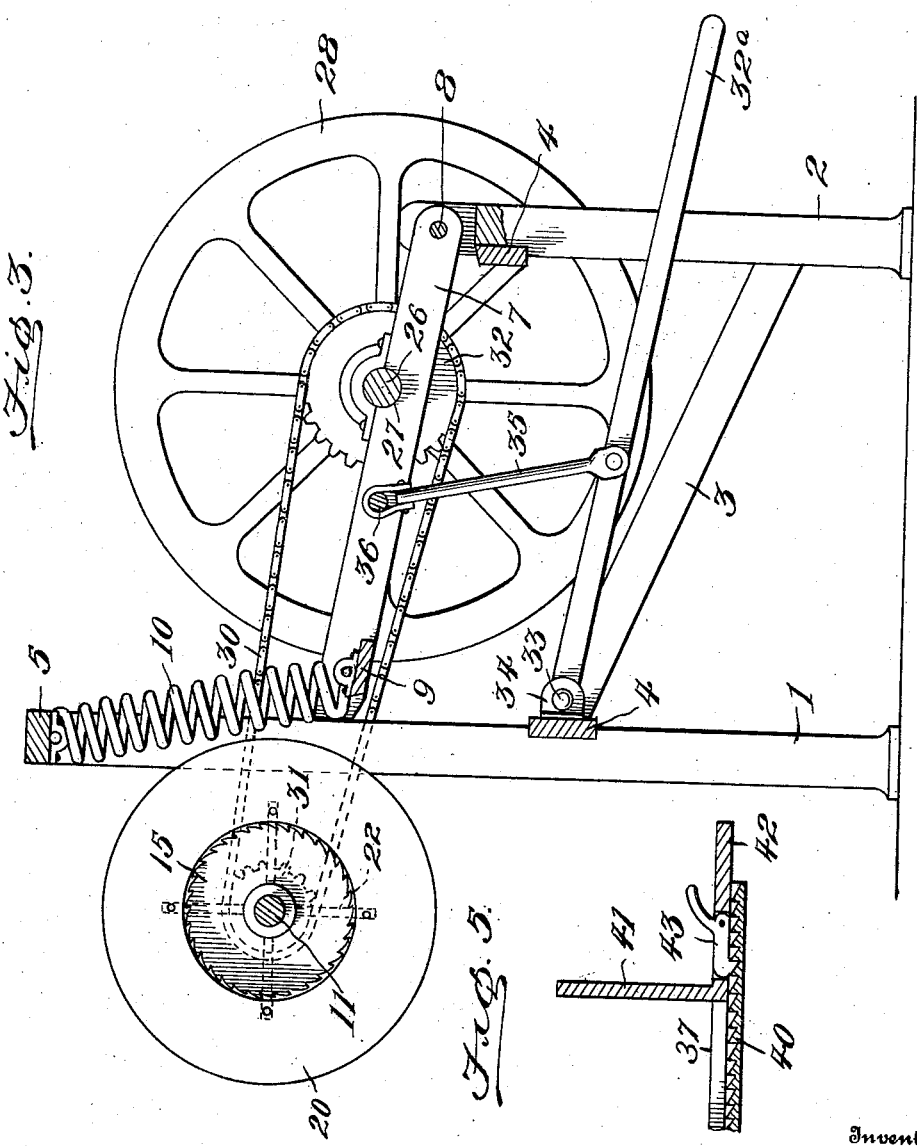
Witnesses
J. L. Wright,
John F. Byrne,
Inventor
Daniel L. Appelberry,
Attorney

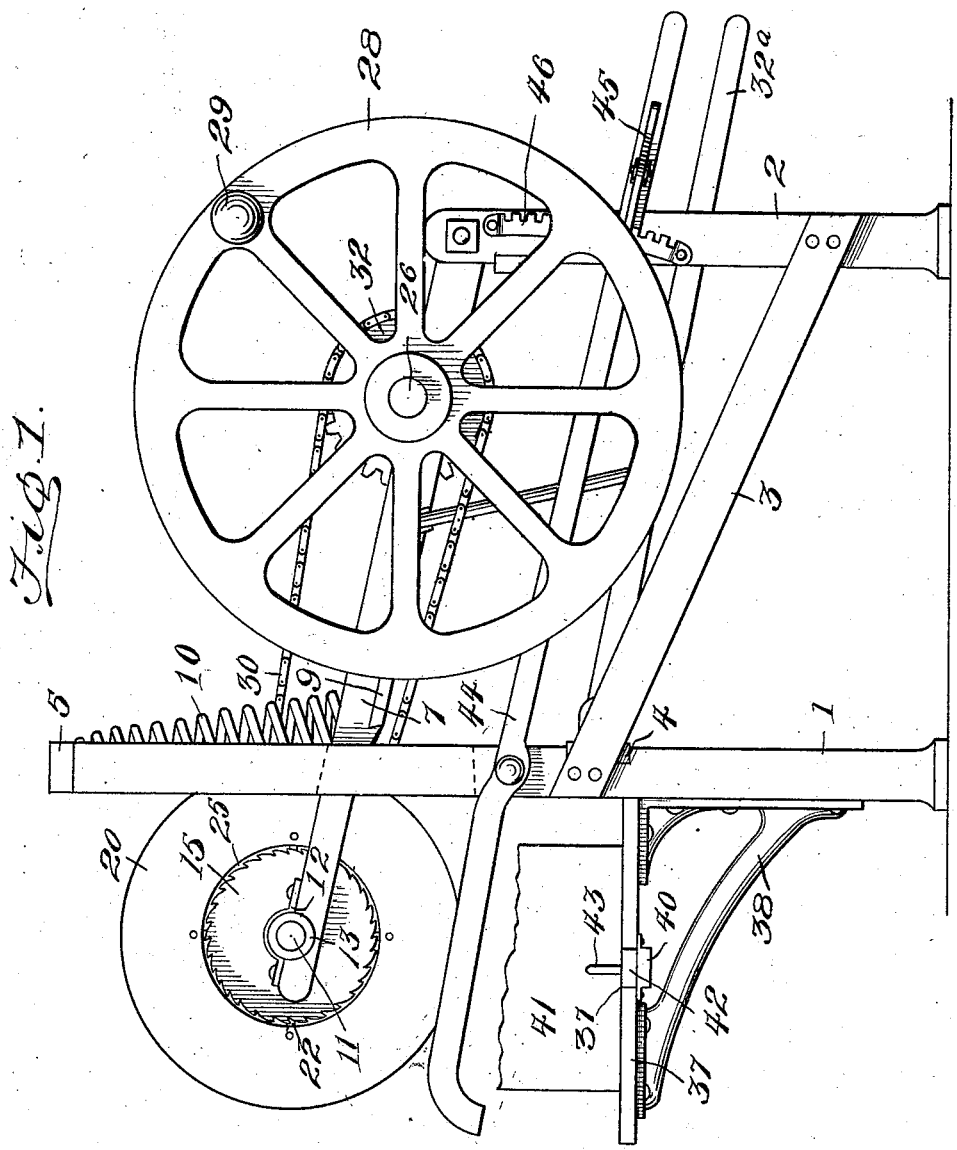

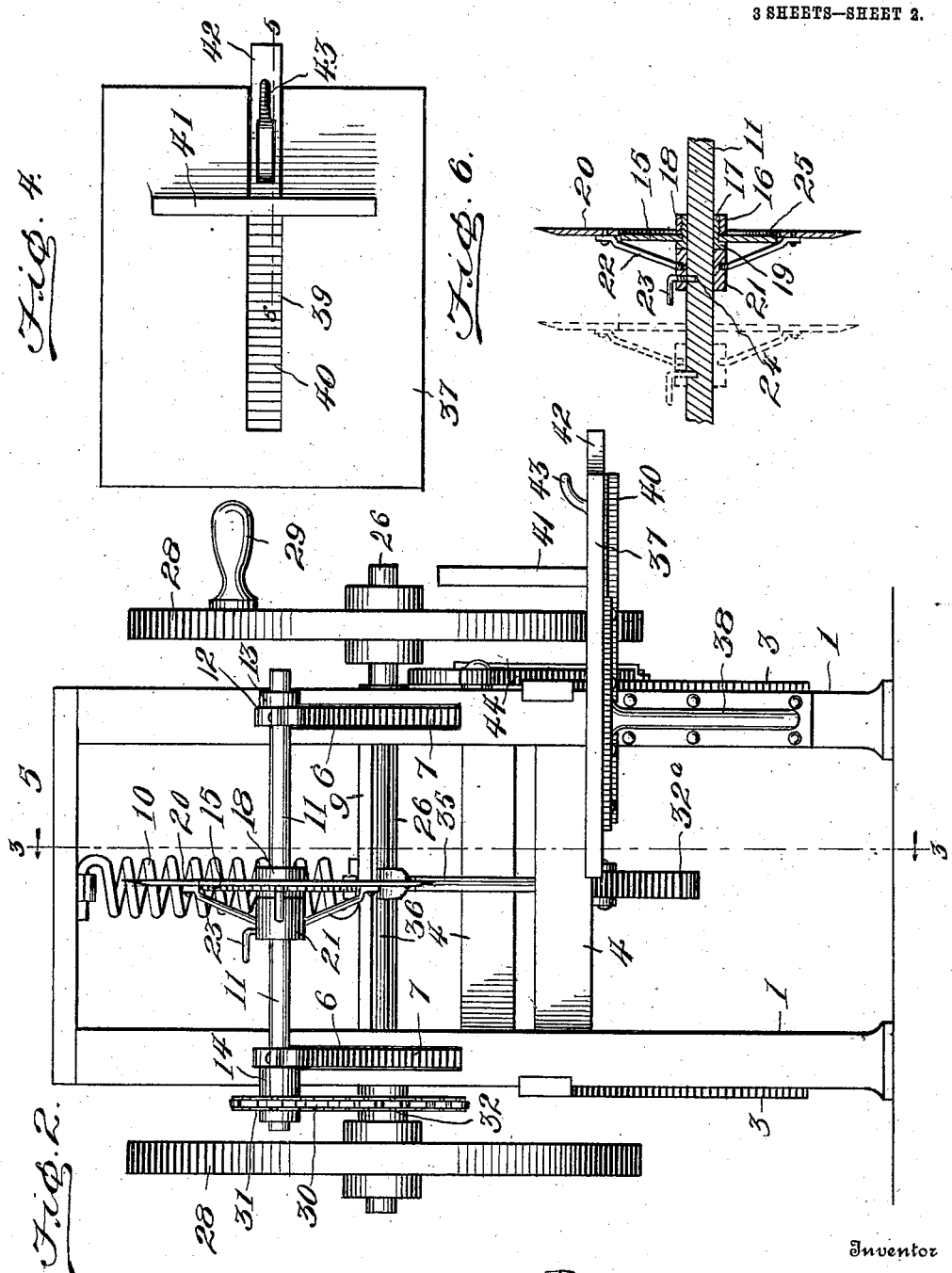

UNITED STATES PATENT OFFICE.

DANIEL L. APPELBERRY, OF PHILLIPS, MONTANA.

MEAT-SLICER.

No. 915,532.　　　Specification of Letters Patent.　　Patented March 16, 1909.

Application filed October 26, 1907. Serial No. 399,302.

*To all whom it may concern:*

Be it known that I, DANIEL L. APPELBERRY, a citizen of the United States, residing at Phillips, in the county of Chouteau and State of Montana, have invented new and useful Improvements in Meat-Slicers, of which the following is a specification.

My invention relates to meat cutting and sawing machines, and one of its objects is to provide a machine of this character which is simple, durable and efficient, which may be operated with the expenditure of the minimum amount of labor, and which may be manufactured and sold at a comparatively low cost.

With the above and other objects in view, the invention consists in the construction, arrangement and combination of parts hereinafter fully described, claimed and illustrated in the accompanying drawings, wherein:

Figure 1 is a view in side elevation of a meat cutting and sawing machine constructed in accordance with my invention. Fig. 2 is a view in front elevation thereof.
Fig. 3 is a sectional view on the line 3—3 of Fig. 2, looking in the direction indicated by the arrows. Fig. 4 is a detail top plan view of the meat supporting board. Fig. 5 is a sectional view on the line 5—5 of Fig. 4.
Fig. 6 is a sectional view illustrating the manner in which the knife and saw are secured in applied position.

Referring to the drawings by reference numerals, 1 and 2 respectively designate front and rear standards which are united and braced by side bars 3 and end bars 4 to provide a suitable frame for my improved meat cutting and sawing machine. The front standards 1 are greater in length than the rear standards 2 and have secured to their upper ends a cross-bar 5, said front standards being provided with longitudinally extending slots 6. A pair of levers 7 are pivotally secured at their rear ends to the upper ends of the rear standards 2 by means of bolts 8, the front ends of the levers passing through the slots 6. The levers are relatively fixed for simultaneous movement by means of the bar 9, and their front ends are yieldingly supported in an elevated position by means of a contractile coiled spring 10 which has its upper end secured to the cross-bar 5 and its lower end to the bar 9. A shaft 11 is journaled at the front ends of the levers 7 in bearings 12, and is held thereon against endwise displacement by means of collars 13 and 14. A circular saw 15 is fixed upon the shaft 11 by means of a member 16. The member 16 consists of a sleeve 17 adapted to receive the shaft 11 and to be received by an opening in the saw 15, and a nut 18 which is adapted to clamp the saw between itself and a head 19 on the sleeve. A circular knife 20 is mounted upon the shaft 11 for longitudinal adjustment through the medium of a hub 21 to which the knife is secured through the medium of spokes or arms 22.

The saw is secured in adjusted position by means of a bolt 23 which is carried by the hub 21 for engagement in a socket 24 in the shaft 11. The knife 20 is provided with an annular opening 25 adapted to receive the saw 15 so that the saw will not form an obstruction to the free use of the knife 20. When it is desired to use the saw 15, the knife 20 is adjusted on the shaft 11 to the position shown by dotted lines in Fig. 6 of the drawings. A power shaft 26 is journaled in bearings 27 located in the levers 7 at points adjacent their rear ends and has mounted thereon balance wheels 28, a hand grip 29 being secured to one of the balance wheels. A sprocket chain 30 is mounted on sprocket wheels 31 and 32 secured respectively to the shaft 11 and the power shaft 26, whereby rotary motion may be imparted to the knife and saw.

A foot lever 32$^a$ is pivotally secured to the front bar 4 through the medium of a pin 33 passing through an ear 34 upon said bar. The foot lever 32 is connected to the levers 7 through the medium of a link 35, one end of said link being secured to the lever and its other end to a rod 36 secured to the levers 7.

In practice, the knife 20 and saw 15 are set in motion and pressure moving gradually downward is applied to the foot lever 32, whereupon the rotating knife 20 is brought into contact with the meat. After the meat has been cut, the pressure is removed from the lever 32 whereupon the knife and saw are returned to their normally elevated position by the spring 10. When it is desired to use the saw the knife is moved to the position shown in dotted lines in Fig. 6 of the drawings. A meat supporting table 37 is secured to one of the front standards 1 by means of the brackets 38, the relatively inner edge of said table being so disposed with relation to the path of movement of the knife and saw that the table will not be engaged thereby. The table is provided in its upper surface with a slot 39 which extends from a point adjacent the relatively inner edge of the table to and through the relatively outer edge of the table, and secured to the underside thereof is a rack bar 40. A follower 41 by means of which the meat may be advanced to the knife and saw is slidably mounted upon the table 37 by means of an arm which is secured to the relatively lower edge thereof and disposed in the slot 39. A dog 43 is pivotally mounted upon the arm 42 for engagement with the rack 40, said dog being adapted to secure the follower in adjusted position. The meat is adapted to be clamped upon the table 37 by means of a lever 44 which is pivotally secured at a point intermediate its ends to that front standard to which the table is secured. The lever 44 is adapted to be held in contact with the meat by means of a pawl 45 which is pivotally secured to the lever for engagement with a rack 46 which is secured to one of the rear standards 2.

From the foregoing description, taken in connection with the drawings hereto annexed, the operation and advantages of this invention will be understood without a further extended description.

Changes in the form, proportions and minor details of construction may be made within the scope of the claims without departing from the spirit or sacrificing any of the advantages of the invention.

Having thus fully described the invention, what is claimed as new is:—

1. A meat slicing machine comprising slotted front standards, a rear standard, levers pivotally secured at their rear ends to the rear standard, the free ends of the levers passing through the slots of the front standards, a spring secured at one end to the front standards and at its other end to the levers, said spring being adapted to normally retain the free ends of the levers elevated, a shaft journaled at the free ends of the levers, a saw secured to the shaft, a power shaft journaled on the levers, a connection between the power shaft and the first named shaft, means by which the power shaft can be rotated, a foot lever pivotally mounted upon the front standards, and a link connecting the levers and the foot lever.

2. A meat slicing machine comprising a frame including front and rear standards, levers pivotally mounted upon the rear standard, a spring secured to the front standard and to the levers, a shaft journaled upon the levers, a power shaft journaled upon the levers, connection between the shafts, a meat supporting table secured to the frame, a follower adjustably mounted upon the table, a meat clamping lever pivotally mounted upon the frame, a rack secured to the frame, and a dog pivotally mounted upon the meat clamping lever for engagement with the rack.

3. A meat slicing machine comprising a revolubly mounted shaft, a circular saw fixed upon the shaft, and a circular knife mounted upon the shaft for adjustment longitudinally thereof with relation to the saw, said knife being provided with a saw receiving opening.

In testimony whereof I affix my signature in presence of two witnesses.

DANIEL L. APPELBERRY.

Witnesses:
 PH. CASELBERG,
 CLAUD W. MOORE.